Jan. 12, 1960 W. J. MORRILL 2,921,208
HOLDBACK
Filed July 20, 1956

INVENTOR.
WAYNE J. MORRILL
BY Woodling + Krost
Attys.

United States Patent Office 2,921,208
Patented Jan. 12, 1960

2,921,208

HOLDBACK

Wayne J. Morrill, Garrett, Ind.

Application July 20, 1956, Serial No. 599,049

5 Claims. (Cl. 310—214)

The invention relates in general to members for dynamoelectric machines and more particularly to holdback members for restraining the movement of the windings in a dynamoelectric machine.

An object of the invention is to provide means to hold the laminations which form a tooth, around which a winding extends, securely together, whereby the end laminations will not flare out and contact the winding with subsequent damage to the winding.

Another object of the invention is to provide a holdback which is adapted to be secured to the tooth of a stator and which has portions which extend beyond the axial extent of the tooth at either end thereof to engage the first and second loop portions of a winding whereby the first and second loop portions are prevented from movement toward the bore of the stator.

Another object of the invention is to provide a holdback having a transverse portion with generally parallel legs extending therefrom which legs have shoulder means extending therefrom at places removed from said transverse portion whereby said holdback may be fixedly secured to the tooth of a stator.

Another object of the invention is to provide a holdback member for a dynamoelectric machine which is secured in place before the winding which it is to restrain is wound to serve as a guide in the winding operation and which is of a plastic construction whereby it may be retained within the machine throughout its useful life to keep selected windings in place and to prevent teeth laminations from flaring out against portions of the windings.

Other objects and a fuller understanding of this invention may be had by referring to the following description and claims, taken in conjunction with the accompanying drawings, in which:

Figure 1:
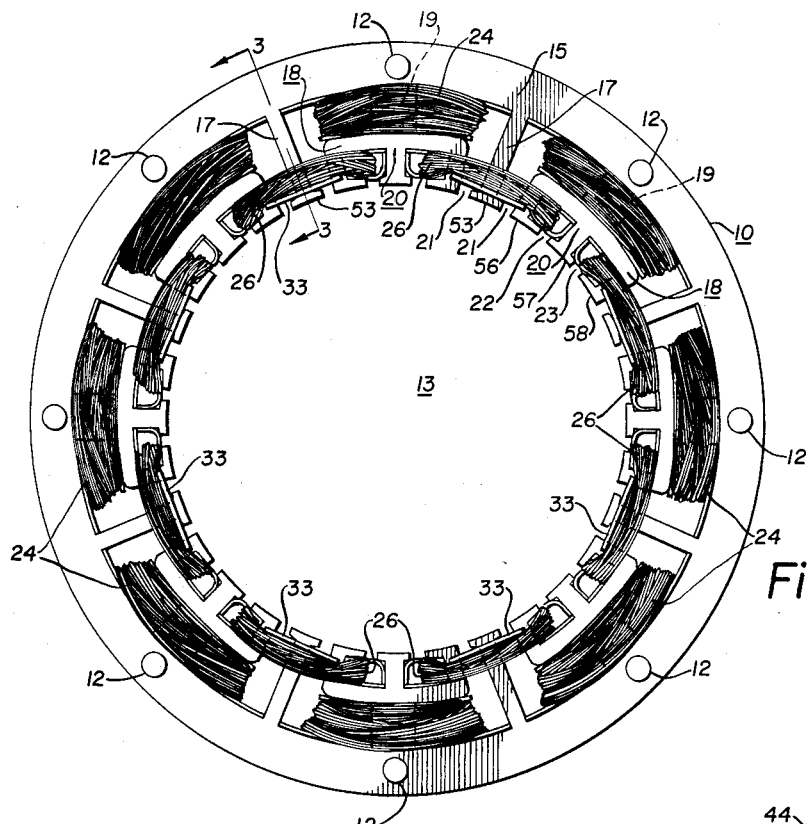
Figure 1 is a plan view of the stator of a dynamoelectric machine having the holdbacks of the present invention incorporated thereon.
Figure 2:
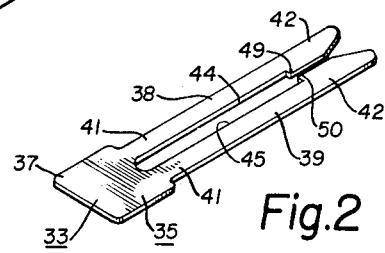
Figure 2 is an isometric view of a holdback of the present invention shown apart from the stator of Figure 1.
Figure 4:
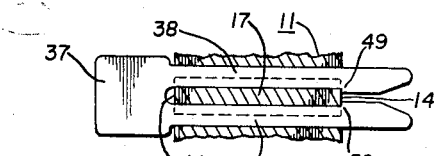
Figure 4 is a view taken along the line 4—4 of Figure 3.

Referring to Figure 1 the reference numeral 10 indicates the stator of a dynamoelectric machine which if formed from a stack of laminations 11 which are secured together at their outer periphery by a plurality of circumferentially spaced pins 12. The stator 10 forms a generally annular configuration with a central axially extending bore 13 in which a rotor (not shown) is adapted to rotate in the completed dynamoelectric machine. The stator construction is substantially the same type of construction which was illustrated in applicant's Patent No. 2,485,628, which issued October 25, 1949.

The stator 10 includes a yoke 15 from which alternately arranged teeth 17 and 18 extend. These teeth extend generally radially inwardly toward the bore 13. The teeth 17 include single teeth which extend straight in from the yoke 15 and the teeth 18 include a narrow section 19 and a wide section 20. The wide section is provided with starting winding slots 22 and 23 which form teeth 56, 57 and 58. The teeth 17 and 18 are alternately disposed about the circumferential extent of the stator 10. Each of the teeth 17 are identical as are the teeth 18. Main winding slots 21 are formed between the teeth 17 and adjacent teeth 18.

A total of eight main windings or coils have been illustrated in Figure 1 with each of these main windings being wound around the narrow section 19 of the teeth 18. Starting windings or coils 26 are provided which have straight run portions or active sides 27. The straight run portions 27 extend through the starting winding slots 22 and 23 and beyond the axial extent of the teeth, and are joined together at opposite end portions by first and second loop portions or end turns 29 and 30, respectively. It will thus be seen that each of the starting windings 26 surrounds or extends around each of the teeth 17.

In present dynamoelectric machines the starting windings must be laced and so secured so that during operation of the machine the windings will not have a tendency to fall or be forced out towards the bore of the machine where they will be struck and physically misused by the movement of the rotor. The end or outermost laminations 14 of the teeth 17 also have a tendency at times to flare outwardly and strike the portions of the windings which make up the loop portions and cause subsequent damage thereto.

Figure 5:
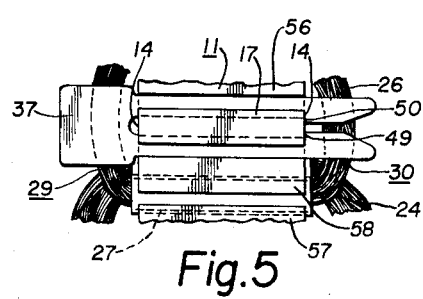
Figure 5 is a view taken along the line 5—5 of Figure 3.
Figure 3:
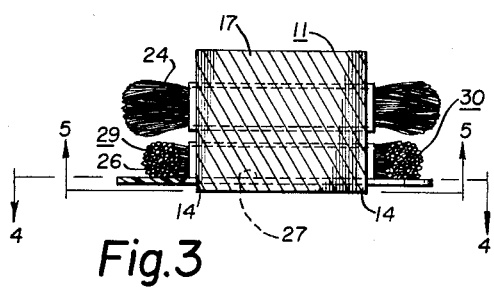
Figure 3 is a view taken along the line 3—3 of Figure 1.

The new and unique holdbacks or end turn supports 33 of the present invention therefore obviate all of the possibilities and as a result provide an improved dynamoelectric machine construction. The holdbacks 33 each comprise a flat unitary plastic structure 35 which includes a transverse portion 37 and first and second legs 38 and 39, respectively. Each of the first and second legs has first and second end portions 41 and 42. The first end portion 41 of each of the first and second legs 38 and 39, respectively, is fixedly secured to the transverse portion and the first and second legs extend from the transverse portion and are substantially parallel to each other. Each of the first and second legs has an inner surface 44 and 45, respectively, which are spaced apart a predetermined distance and also extend generally parallel to each other. First and second shoulders 49 and 50 are provided on the second end portion of the first and second legs 38 and 39, respectively, and extend inwardly toward each other from the inner surfaces of the legs. The inner surfaces of the legs and the first and second shoulder members comprise wall means for snugly engaging the tooth 17 so that the tooth 17 and the holdback are fixedly secured with respect to each other. When the holdbacks 33 are placed on the teeth 17 of the stator the transverse portions 37 are located beyond the axial extent of the teeth 17 (Figure 5) at one end portion thereof and the first and second legs 38 and 39 extend respectively axially on either side of the teeth 17 with the inner surfaces 44 and 45, respectively, engaging the teeth and these legs 38 and 39 extend beyond the axial extent of the teeth 17 at another end portion of the teeth. The first and second shoulders 49 and 50 snap over the end laminations of the teeth 17 at the other end portion thereof to securely anchor the holdbacks to the teeth 17. The transverse portions 37 are adapted to engage the first loop portion 29 of the starting windings 26 and the second end portion of the first and second legs 38 and 39 are adapted to engage the second loop portion 30 of the starting windings. This prevents the starting windings 26 and more particularly the first and second loop portions thereof from any possible movement into the bore 13 where they would be damaged by the movement of the rotor. The teeth as will be noted, are provided with a flared end portion 53 which prevents the holdbacks from working radially off the ends of the teeth into the bore. The wall means of the holdbacks surrounding the laminations, which make up the teeth 17, insure that the laminations are held securely together and no flaring thereof can result.

In constructing the stator which has been shown and illustrated in the accompanying drawings, the main windings 24 are first wound on the narrow section 19 of the teeth 18. The holdbacks are then slipped into place on their respective teeth 17 at a point near the yoke 15 of the stator 10. They are then pulled radially outwardly on the teeth 17 toward the bore of the dynamoelectric machine until their further movement is prevented by the flared end 53 of the teeth 17. After this has been accomplished the starting windings 26 are wound in their proper places. The holdbacks effectively serve to guide the starting windings as they are being wound and because of their plastic construction remain with the stator throughout its useful life.

It will thus be seen that the problems of the flaring of the individual laminations which make up the teeth with subsequent damage to the windings and movement of the windings into contact with the rotor of the dynamoelectric machine have been obviated and with the use of the shoulders on the legs of the holdbacks, opposite the transverse portions, assure that the holdbacks will never become dislodged from the position in which they are initially placed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a dynamoelectric machine including a laminated annular stator having a yoke slotted to provide teeth extending generally radially inwardly therefrom, coils each having active sides lying in selected slots and joined by end turns; end turn supports each comprising a flat unitary plastic structure including a transverse portion, first and second legs extending from said transverse portion and being substantially parallel to each other, first and second shoulders extending from said first and second legs respectively at portions removed from said transverse portion, said end turn supports residing on selected teeth which selected teeth are substantially midway between the active sides of each coil, said transverse portions extending beyond the axial extent of said selected teeth at one end portion thereof, said first and second legs extending respectively axially on either side of said selected teeth and beyond the axial extent of said selected teeth at another end portion thereof, said first and second shoulders hooking over the ends of said selected teeth at said other end portion thereof to securely anchor said end turn supports and the laminations of said selected teeth with respect to each other, said transverse portions and said first and second legs engageable with said end turns of said coils to prevent said coils from radial inward movement.

2. In a dynamoelectric machine including an annular stator having a yoke slotted to provide at least one tooth extending generally inwardly therefrom, a coil having active sides extending on either side of said tooth and joined by end turns; an end turn support comprising a flat unitary structure including a transverse portion, first and second legs extending from said transverse portion and each having inner surfaces substantially parallel to each other, first and second shoulders extending from said first and second surfaces respectively at portions removed from said transverse portion, said end turn support residing on said tooth which tooth is substantially midway between the active sides of said coil, said transverse portion extending beyond the axial extent of said tooth at one end portion thereof, said first and second legs extending respectively axially on either side of said tooth with said respective inner surface thereof engaging either side of said tooth and beyond the axial extent of said tooth at another end portion thereof, said first and second shoulders hooking over the ends of said tooth at said other end portion thereof to securely anchor said end turn support to said tooth, said transverse portion and said first and second legs engageable with said end turns of said winding to prevent said winding from inward movement.

3. In a dynamoelectric machine including a stator having a yoke with a tooth extending therefrom and a coil having end turns surrounding same; an end turn support including a transverse portion, first and second legs extending from said transverse portion, first and second shoulders extending from said first and second legs respectively at portions removed from said transverse portion, said end turn support resting on said tooth, said transverse portion being located beyond the extent of said tooth at one portion thereof, said first and second legs extending respectively on either side of said tooth and beyond the extent of said tooth at another portion thereof, said first and second shoulders hooking over a portion of the tooth remote from said transverse portion to securely anchor said end turn support relative to said tooth, said transverse portion and portions of said first and second legs engageable with said end turns.

4. A U-shaped end turn support mounted on the tooth of a dynamoelectric machine to restrain the end turns of a coil comprising a flat unitary plastic structure including a transverse portion and first and second leg members, said first and second leg members being fixedly secured to said transverse portion at a first end portion and extending therefrom, each said leg having an inner surface which extends generally parallel to the inner surface of the other leg, said first and second leg members being spaced from each other a predetermined distance, a first shoulder member extending from the inner surface of said first leg at a second end portion thereof and a second shoulder member extending from the inner surface of said second leg at a second end portion thereof, said inner surfaces of said legs and said first and second shoulder members comprising wall means for snugly engaging said tooth.

5. In a dynamoelectric machine having tooth means with a coil having coil sides and end turns the provision of an end turn support including a transverse portion, first and second spaced legs extending from said transverse portion, first and second shoulders extending from said first and second legs, respectively, at portions removed from said transverse portion, said end turn support located on said tooth means with said transverse portion being located beyond the extent of said tooth means at one portion thereof, said first and second legs extending generally in the same direction as the coil sides and beyond the extent of said tooth means at another portion thereof, said first and second shoulders engaging a portion of said tooth means spaced from said transverse portion to hold said end turn support on said tooth means, said transverse portion and portions of said legs being engageable with the end turns.

References Cited in the file of this patent

UNITED STATES PATENTS

| | | |
|---|---|---|
| 2,114,887 | Mueller | Apr. 19, 1938 |
| 2,149,569 | Borrett | Mar. 7, 1939 |
| 2,485,628 | Morrill | Oct. 25, 1949 |
| 2,615,944 | Carlson | Oct. 28, 1952 |
| 2,701,317 | Herman | Feb. 1, 1955 |

FOREIGN PATENTS

| | | |
|---|---|---|
| 407,088 | France | Feb. 18, 1910 |